United States Patent
Matsumoto et al.

(10) Patent No.: US 12,091,252 B2
(45) Date of Patent: Sep. 17, 2024

(54) PARTS STORAGE POSITION DETERMINATION APPARATUS, PARTS STORAGE POSITION DETERMINATION METHOD AND PARTS MANAGEMENT SYSTEM

(71) Applicant: Honda Motor Co., Ltd., Tokyo (JP)

(72) Inventors: Maiko Matsumoto, Tochigi (JP); Kenichi Yamakami, Tochigi (JP); Yuki Kitajima, Tochigi (JP); Kaoru Shibata, Tochigi (JP); Shunsuke Hashiguchi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 643 days.

(21) Appl. No.: 17/428,952

(22) PCT Filed: Feb. 12, 2020

(86) PCT No.: PCT/JP2020/005251
§ 371 (c)(1),
(2) Date: Aug. 5, 2021

(87) PCT Pub. No.: WO2020/170898
PCT Pub. Date: Aug. 27, 2020

(65) Prior Publication Data
US 2022/0135327 A1 May 5, 2022

(30) Foreign Application Priority Data
Feb. 21, 2019 (JP) .................. 2019-029075

(51) Int. Cl.
*B65G 1/137* (2006.01)
(52) U.S. Cl.
CPC ...... *B65G 1/137* (2013.01); *B65G 2203/0233* (2013.01)

(58) Field of Classification Search
CPC ............ B65G 1/137; B65G 2203/0233; G06Q 10/087
See application file for complete search history.

(56) References Cited

U.S. PATENT DOCUMENTS

| | | | |
|---|---|---|---|
| 2008/0071418 A1 | 3/2008 | Antony et al. | |
| 2017/0330138 A1* | 11/2017 | Stoeckel | G06Q 10/06315 |
| 2018/0068255 A1* | 3/2018 | Hance | G06Q 10/087 |

FOREIGN PATENT DOCUMENTS

| | | |
|---|---|---|
| JP | S5812504 U | 1/1983 |
| JP | H0891516 A * | 4/1996 |

(Continued)

OTHER PUBLICATIONS

Canadian Office action; Application 3130737; Jan. 10, 2023.
International Search Report; Application PCT/JP2020/005251; May 19, 2020.

*Primary Examiner* — Jacob S. Scott
*Assistant Examiner* — Erin Morris
(74) *Attorney, Agent, or Firm* — Duft & Bornsen, PC

(57) ABSTRACT

An apparatus configured to determine a storage position of a plural type of parts to be assembled to a workpiece corresponding to a plural type of products produced in a predetermined period in accordance with a production schedule, in a storage section having a plural row of storage space facing a lane. The apparatus is configured to store a correspondence relationship between a type of the workpiece corresponding to the products and a type of the parts to be assembled to the workpiece, determine the storage position of the plural type of parts in the storage section based on the correspondence relationship, and to output the storage position. The apparatus determines the storage position so that each of the plural type of parts corresponding to the workpiece is respectively dispersed into each of the plural row of the storage section.

6 Claims, 17 Drawing Sheets

(56) References Cited

FOREIGN PATENT DOCUMENTS

| JP | H09150923 | A | * | 6/1997 |
| JP | H09150923 | A | | 6/1997 |
| JP | 2005119787 | A | | 5/2005 |
| JP | 2011215992 | A | * | 10/2011 |
| JP | 2011215992 | A | | 10/2011 |
| JP | 2018188236 | A | | 11/2018 |

* cited by examiner

FIG. 4

| Type of Workpiece | | P01 | P02 | P03 | P04 | P05 | P06 | P07 | P08 | P09 | P10 | P11 | P12 | P13 | P14 | P15 | P16 | P17 | P18 | P19 | P20 | P21 | P22 | P23 | P24 | P25 | P26 | P27 |
|---|---|---|---|---|---|---|---|---|---|---|---|---|---|---|---|---|---|---|---|---|---|---|---|---|---|---|---|---|
| Model A | A1 | ● | ● |   | ● |   |   |   |   |   | ● |   | ● |   |   | ● |   | ● |   |   |   |   |   | ● |   |   |   |   |
|  | A2 | ● | ● |   | ● |   |   |   |   |   | ● |   | ● |   |   |   |   | ● |   |   |   |   |   | ● |   | ● |   |   |
|  | A3 | ● | ● |   |   | ● |   |   |   |   | ● |   | ● |   |   |   |   |   | ● |   | ● |   |   | ● |   | ● |   |   |
|  | A4 | ● | ● |   | ● |   |   |   |   |   | ● |   | ● |   |   |   |   | ● | ● |   | ● |   |   | ● |   |   |   |   |
| Model B | B1 | ● | ● |   |   |   | ● |   |   |   | ● |   |   | ● |   |   |   |   | ● |   | ● |   |   |   |   |   |   |   |
|  | B2 | ● | ● |   |   |   | ● |   |   |   | ● |   |   | ● |   |   |   |   | ● | ● | ● |   |   |   |   |   |   |   |
|  | B3 | ● | ● |   | ● |   |   |   |   |   | ● |   |   | ● |   |   |   |   | ● |   | ● |   |   |   |   |   | ● |   |
|  | B4 | ● | ● |   | ● |   |   |   |   |   | ● |   |   | ● |   |   |   |   |   |   | ● |   |   |   |   |   |   |   |
| Model C | C1 | ● | ● | ● |   |   |   | ● |   | ● |   | ● |   |   |   |   | ● |   |   |   | ● |   | ● |   | ● |   |   |   |
|  | C2 | ● | ● | ● |   |   |   | ● |   | ● |   | ● |   |   |   |   | ● |   |   |   | ● |   | ● |   | ● |   |   |   |
| Model D | D1 | ● | ● |   |   |   |   |   |   |   | ● |   |   |   | ● |   | ● |   |   |   |   |   |   |   |   |   |   |   |
|  | D2 | ● | ● |   | ● |   |   |   |   |   | ● |   |   |   | ● |   | ● |   | ● |   |   |   |   |   | ● |   |   |   |
|  | D3 | ● | ● |   |   | ● |   |   |   |   | ● |   |   |   | ● | ● |   |   |   |   |   | ● |   |   | ● |   |   |   |
|  | D4 | ● | ● |   |   |   |   |   | ● |   | ● |   |   |   | ● | ● |   |   |   |   |   | ● | ● |   | ● |   |   |   |
|  | D5 | ● | ● |   |   |   | ● |   |   |   | ● |   |   |   | ● | ● |   |   |   | ● |   |   |   |   |   |   |   | ● |
|  | D6 | ● | ● |   | ● |   |   |   |   |   | ● |   |   |   | ● |   |   | ● |   |   |   |   |   | ● |   |   |   | ● |

Type of Parts

FIG. 8

| | FIRST ROW | SECOND ROW | THIRD ROW | FOURTH ROW | FIFTH ROW | |
|---|---|---|---|---|---|---|
| FIRST STAGE | P04 | P11 | P01 | P02 | P09 | |
| SECOND STAGE | P05 | P12 | VACANT | P03 | P10 | |
| THIRD STAGE | P07 | P13 | VACANT | VACANT | VACANT | ←20L |
| FIRST STAGE | P06 | P14 | VACANT | VACANT | VACANT | ←20R |
| SECOND STAGE | P08 | VACANT | VACANT | VACANT | VACANT | |
| THIRD STAGE | VACANT | VACANT | VACANT | VACANT | VACANT | |
| | FIRST ROW | SECOND ROW | THIRD ROW | FOURTH ROW | FIFTH ROW | |
| | Gr3 | Gr5 | Gr1 | Gr2 | Gr4 | |

23

PARTS STORAGE POSITION DETERMINATION APPARATUS, PARTS STORAGE POSITION DETERMINATION METHOD AND PARTS MANAGEMENT SYSTEM

CROSS-REFERENCE TO RELATED APPLICATION

This application is a National Stage of PCT international application Ser. No. PCT/JP2020/005251 filed on Feb. 12, 2020 which designates the United States, incorporated herein by reference, and which is based upon and claims the benefit of priority from Japanese Patent Application No. 2019-029075, filed on Feb. 21, 2019, the entire contents of which are incorporated herein by reference.

TECHNICAL FIELD

This invention relates to a parts storage position determination apparatus and a parts storage position determination method configured to determine storage positions of parts to be assembled to workpieces, and a parts management system configured to manage the parts.

BACKGROUND ART

As a technology of this kind, there has been known a method in which, when plural articles are arranged on a shelf, the arrangement position of the articles is determined in accordance with the picking frequency of the articles (for example, see Patent Document 1). In the method described in Patent Document 1, the articles are arranged in descending order of picking frequency, and the articles are arranged so that the plural articles are not picked from one row area at the same time.

CITATION LIST

Patent Literature

Patent Document 1: Japanese Unexamined Patent Publication No. H09-150923

DISCLOSURE OF INVENTION

Problems to be Solved by the Invention

However, generally articles having a low picking frequency are also disposed on the shelf, in the method described in the Patent Document 1, the row area of the shelf in which the articles having a low picking frequency are arranged may be passed by during the picking work, and it is difficult to efficiently perform the picking work.

Means for Solving Problem

An aspect of the present invention is a parts storage position determination apparatus configured to determine a storage position of a plural type of parts to be assembled to a workpiece corresponding to a plural type of products produced in a predetermined period in accordance with a production schedule, in a storage section having a plural row of storage space facing a lane. The parts storage position determination apparatus includes: a storage unit configured to store a correspondence relationship between a type of the workpiece corresponding to the products produced in the predetermined period and a type of the parts to be assembled to the workpiece with respect to each type of the workpiece; an arithmetic unit configured to determine the storage position of the plural type of parts in the storage section based on the correspondence relationship stored in the storage unit; and an output unit configured to output the storage position determined by the arithmetic unit. The arithmetic unit determines the storage position of the plural type of parts in the storage section, so that each of the plural type of parts corresponding to the workpiece is respectively dispersed into each of the plural row of the storage section.

Another aspect of the present invention is a parts management system configured to manage a plural type of parts to be assembled to a workpiece corresponding to a plural type of products produced in a predetermined period in accordance with a production schedule. The parts management system includes: the parts storage position determination apparatus; the storage section configured to store the plural type of parts; and a display unit configured to display the storage position outputted by the output unit.

Another aspect of the present invention is a parts storage position determination method configured to determine a storage position of a plural type of parts to be assembled to a workpiece corresponding to a plural type of products produced in a predetermined period in accordance with a production schedule, in a storage section having a plural row of storage space facing a lane. The parts storage position determination method includes: determining a storage position of the plural type of parts in the storage section based on a correspondence relationship between a type of the workpiece corresponding to the products produced in the predetermined period and a type of the parts to be assembled to the workpiece with respect to each type of the workpiece, stored beforehand; and outputting the storage position determined. The determining includes determining the storage position of the plural type of parts in the storage section, so that each of the plural type of parts corresponding to the workpiece is respectively dispersed into each of the plural row of the storage section.

Effect of the Invention

According to the present invention, it becomes possible to determine parts storage position so that the picking work is performed efficiently.

BRIEF DESCRIPTION OF DRAWINGS

FIG. 4 is a table showing an example of correspondence relationship between types of workpieces corresponding to products produced in a predetermined period and types of parts used for the workpieces.

FIG. 8 is a drawing schematically showing arrangement of the parts stored in the storage section in FIG. 7B, seen from left and right sides.

DESCRIPTION OF EMBODIMENT

Hereinafter, an embodiment of the present invention will be described with reference to FIG. 1 to FIG. 13C. A parts storage position determination apparatus according to the embodiment of the present invention is an apparatus for managing parts of various types of products produced in accordance with a production schedule, i.e., a plural type of parts to be assembled to workpieces corresponding to the various types of products, and is an apparatus for determining storage positions of the plural type of parts in a storage location such as a shelf. The products include not only finished products but also products before completion (intermediate products). In addition, the workpieces include body frames, engine blocks and the like which are introduced into a production line in correspondence to various products such as vehicles, engines or the like, and to which various types of parts are assembled in assembly process, workpieces to which various types of coating material is applied in coating process, and the like. In addition, the parts include parts to be assembled to workpieces in the assembling process, various types of paints applied to workpieces in coating process, tools and jigs used in various types of processes, and the like.

Figure 1:
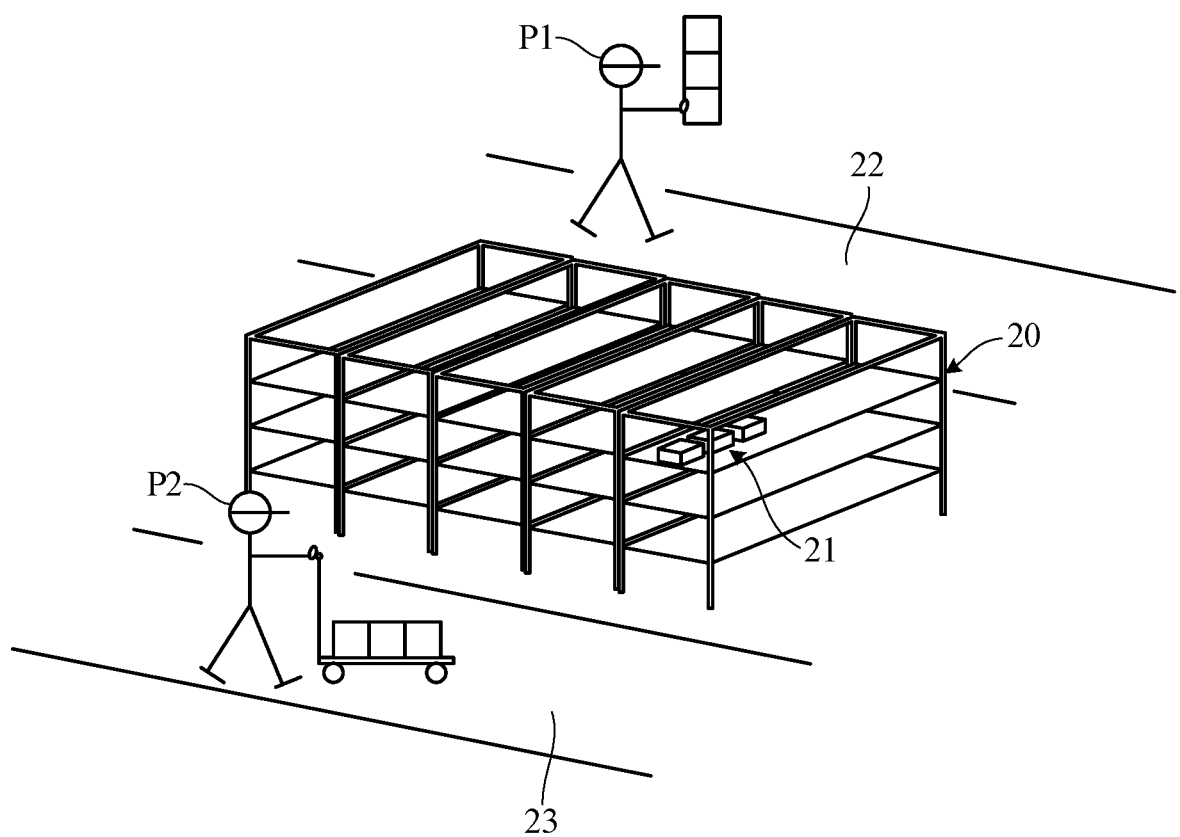
FIG. 1 is a drawing showing an example of "distribution" to which a parts storage position determination apparatus according to an embodiment of the present invention is applied.

In factory production lines for automobiles or the like, in order to improve productivity, "distribution" is performed for preparing parts required for a predetermined period, for example, for daily production, in accordance with a production schedule prior to the predetermined period. In the distribution, for example, plural parts to be assembled to each workpiece, i.e., plural parts corresponding to each workpiece, are taken out from the storage location (picking), mounted on delivery trucks or the like, and supplied to the production line. FIG. 1 is a diagram showing an example of the distribution to which the parts storage position determination apparatus according to the embodiment of the present invention is applied.

As shown in FIG. 1, parts 21 used in a predetermined period are stored in a shelf (storage section) 20 having a storage space of plural rows (five rows in the drawing) and plural stages (three stages in the drawing) facing a storing-side lane 22 and a picking-side lane 23 of the parts 21. The parts storage position determination apparatus determines storage positions of each parts 21 in the storage section 20 by specifying rows and stages of the shelf.

When a worker P1 on the lane 22 side stores each of the parts 21 in the storage space in accordance with the determined storage position, a worker P2 on the lane 23 side picks the stored parts 21. Storing and picking of the parts 21 may be performed automatically by a facility such as a robot, in this case, the determined storage position is output to a facility controller or the like. The parts 21 stored in the storage position are delivered from the storing-side to the picking-side by pipe shooters or conveyors or the like, sequentially in the storing order. It is also possible to store the parts from the picking-side (lane 23 side) of the storage section 20.

Figure 2:
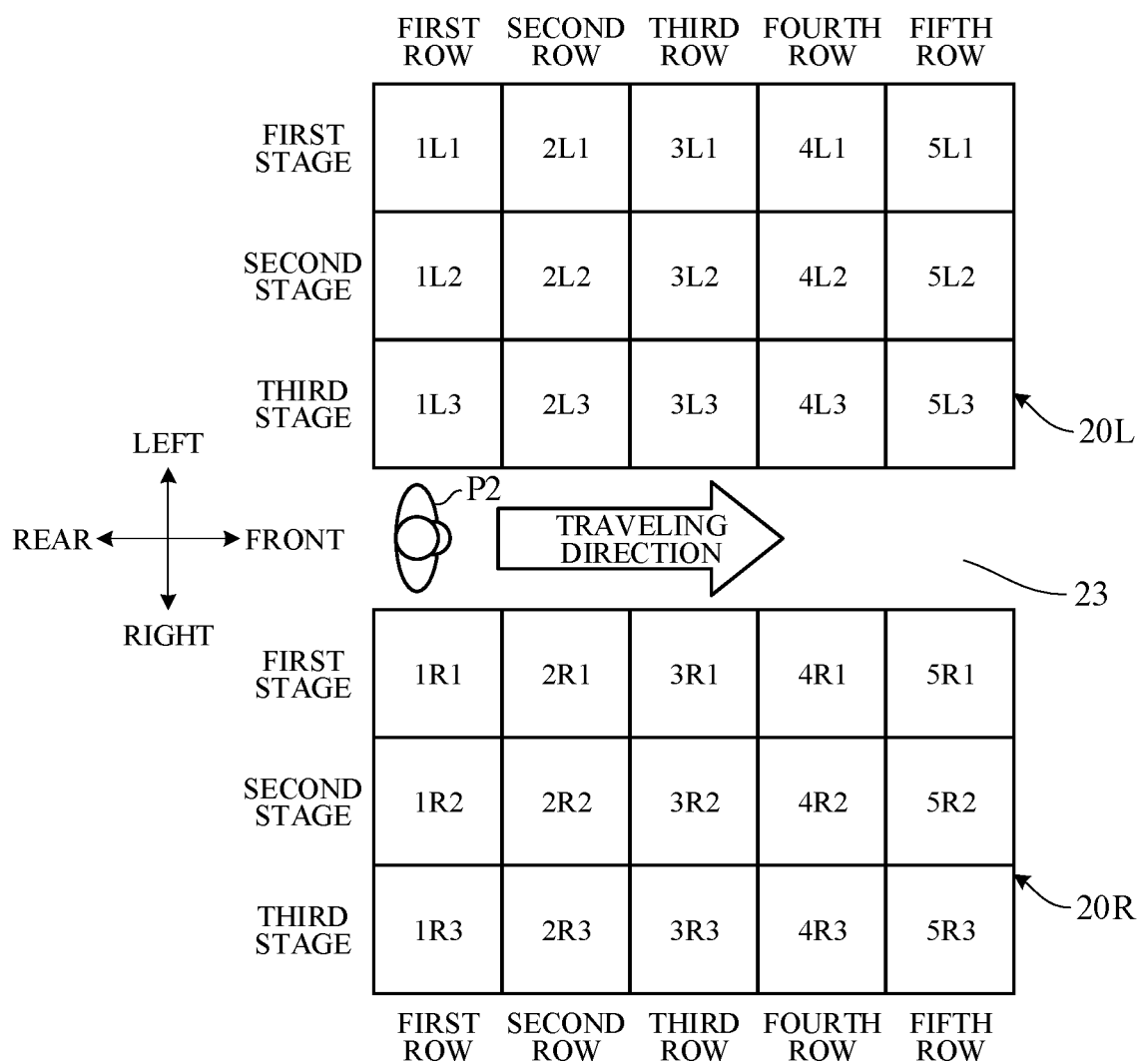
FIG. 2 is a drawing schematically showing configuration of a storage section in FIG. 1.

FIG. 2 is a drawing schematically showing configuration of the storage section 20. In the following, for convenience, front-rear direction and left-right direction are defined with reference to the worker P2 who performs the picking work as shown in the drawing. As shown in FIG. 2, the storage section 20 is provided on left and right sides of the picking-side lane 23 respectively, and represented as storage section 20L, 20R respectively.

Each storage section 20L, 20R has a shelf of plural rows (five rows) respectively partitioned into plural stages (three stages) in the vertical direction, for example, along a traveling direction during the picking work, i.e. a course of the worker P2, as indicated by an arrow. In FIG. 2, the stages of the shelves are shown expanded on a plane for the sake of convenience. That is, arrangements of the storage positions seen from the left and right sides of each storage sections 20L, 20R are shown schematically.

Since the shelf is the three-stage configuration, there are six storage spaces in one same row of the left and right shelves in total, and there are thirty storage spaces in the entire storage section 20. For convenience, the storage position corresponding to each storage space is represented as shown in the drawing. That is, each storage position is identified using number representing the row (1 to 5), letter representing the left and right (L, R), and number representing the stage (1 to 3). For example, the storage position of the third stage of the second row on the left side is represented as "2L3".

For convenience, each storage space is shown as having the same depth (length in the left-right direction), opening (length in the front-rear direction), and height (length in the vertical direction), but the depth, opening, and height of each storage space can be changed arbitrarily. For example, it is possible to change the length or number of pipes or the like constituting the shelf, or to change the partitioning position of the shelf so that the number of rows becomes four or less or six or more and the number of stages becomes two or less or four or more.

Each parts 21 are stored directly in the storage position, or in a state as accommodated in a container having an opening on the upper, left or right side. When the parts 21 are accommodated in the container, containers of the same shape can be used regardless of the type of the parts. In this case, each storage space of the storage section 20 is determined in advance as a predetermined opening and height in accordance with the width and height of the container. Different containers may also be used in accordance with the shape and type of the parts.

Figure 3:
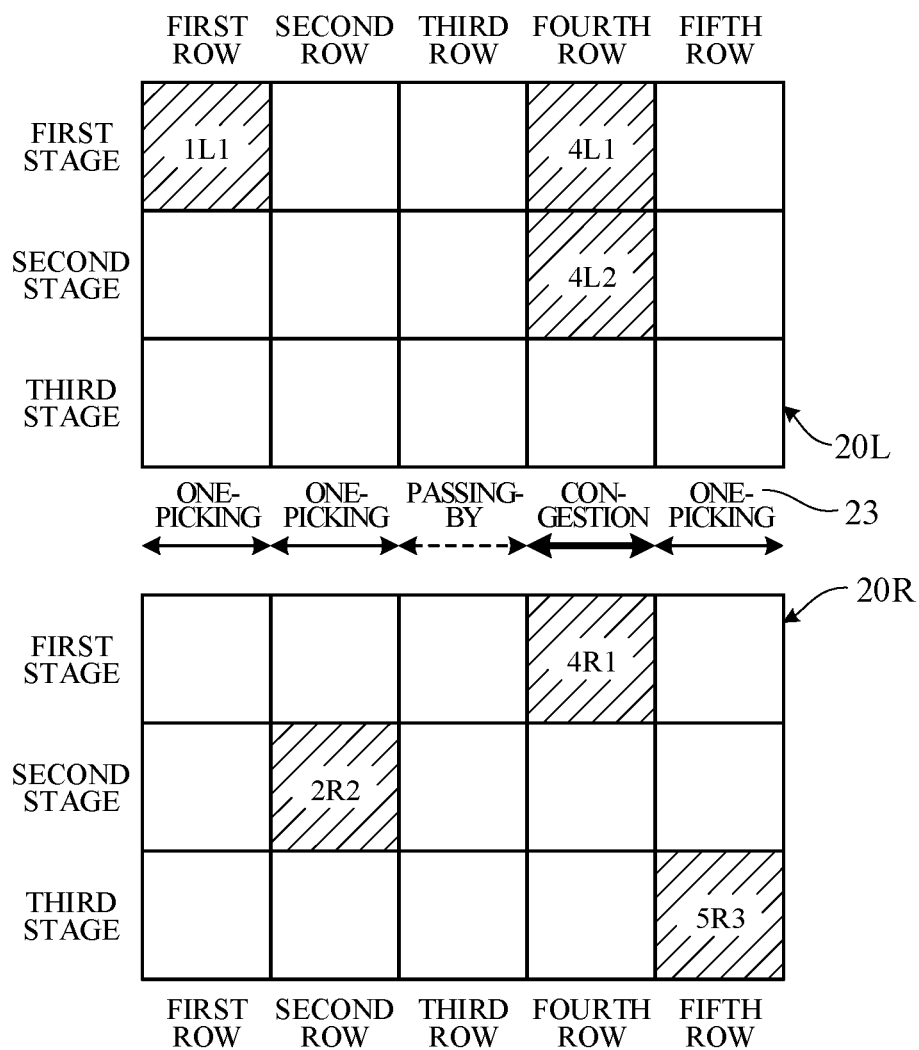
FIG. 3 is a drawing for explaining efficiency of picking work.

FIG. 3 is a drawing for explaining efficiency of the picking work, and shows the storage space in FIG. 2. When performing the picking work picking the parts stored in each row of the storage section 20 sequentially along the traveling direction (FIG. 2), if there is a bias in the rows in which the parts 21 required for the distribution of each workpiece is stored, the efficiency of the picking work is lowered.

In the example in FIG. 3, the parts required for the distribution of a particular workpiece are stored in the storage position 1L1, 2R2, 4L1, 4L2, 4R1, and 5R3. In such a case, one picking work is performed in each row in the first row, second row, and fifth row, but no picking work is performed in the third row (passing-by) and the efficiency of the picking work with respect to the walking amount of the worker is lowered. Further, in the fourth row, since the picking work is performed from plural storage positions 4L1, 4L2, and 4R1, the time required is lengthened, and therefore, when plural workers sequentially perform the picking work, the fourth row becomes a bottleneck (congestion) and the entire picking work efficiency is lowered.

Therefore, in the present embodiment, the parts storage position determination apparatus is configured as follows, so that the occurrence of the passing-by and the congestion in each row of the storage section 20 is suppressed regardless of the type of the workpiece and the picking work can be performed efficiently.

The parts storage position determination apparatus according to the present embodiment determines the storage position of the parts 21 in consideration of the following three conditions.

1. One-Row-One-Picking Condition
2. Combination Optimizing Condition
3. Layout Condition The one-row-one-picking condition is a condition in which, when the worker P2 travels along the lane 23, the picking work of at least one of the parts is performed in every row of the shelves of the storage section 20. The combination optimizing condition is a condition for optimizing the storage efficiency of the parts 21 stored in each storage space of the storage section 20. The layout condition is a condition for efficiently laying out the storage section 20. First, the one-row-one-picking condition will be described.

The one-row-one-picking condition is a condition that at least one of the parts is picked in every row of the storage section 20 regardless of the type of the workpiece to be distributed, i.e., the workpiece corresponding to the product produced in a predetermined period. The one-row-one-picking condition is a condition for improving the efficiency of the picking work with respect to the walking amount of the worker P2 by suppressing the occurrence of the passing-by in each row of the storage section 20. Considering the one-row-one-picking condition, the parts 21 to be stored in the storage section 20 is classified into parts groups to be stored in the one same row of the storage section 20.

FIG. 4 is a table showing an example of correspondence relationship between the types of workpieces corresponding to products produced in a predetermined period and the types of the parts 21 used for the workpieces. As shown in FIG. 4, the types of parts 21 used for each workpiece (P01 to P27 in the figure) differ according to the types of the workpieces such as the model and specifications (A1 to D6 in the figure). For example, the parts P01, P02, P04, P10, P12, P15, P17, and P23 are used for the workpiece A1. That is, in the distribution for the workpiece A1, these parts 21 are picked from the storage section 20.

Figure 5:
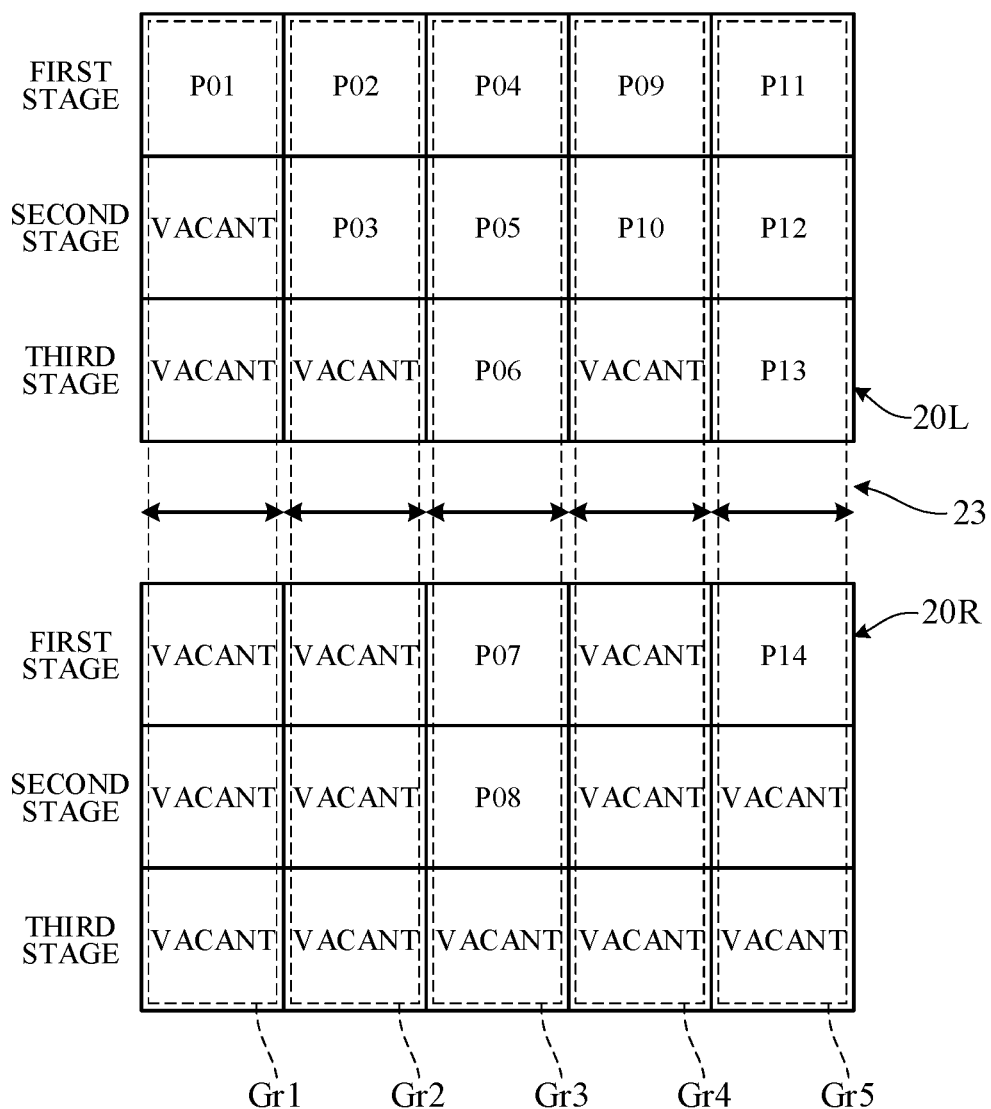
FIG. 5 is a drawing showing an example of parts groups provisionally determined to satisfy one-row-one-picking condition.

FIG. 5 is a drawing showing an example of the parts groups provisionally determined to satisfy the one-row-one-picking condition. The twenty seven types of parts P01 to P27 shown in FIG. 4 are sequentially classified into five parts groups Gr1 to Gr5 corresponding to five rows of the storage section 20 based on the correspondence relationship between the types of the workpiece and the types of the parts 21.

First, the parts group for the parts P01 is considered. As shown in the correspondence relationship in FIG. 4, since the parts P01 will be used for all workpieces, even if the parts P01 is stored in a single row alone, the passing-by does not occur regardless of the type of the workpiece to be distributed. As shown in FIG. 5, such parts P01 is provisionally determined as a single parts group Gr1 alone.

Next, the parts group for the parts P02 is considered. Since the parts P02 will not be used for the workpiece C1, C2, when storing the parts P02 in a single row alone, the passing-by occurs during the distribution of the workpiece C1, C2. Such parts P02 is provisionally determined as the parts group Gr2 in combination with any one of the parts P03, P07, P09, and P11. In the example of FIG. 5, the parts P02 is provisionally determined as one parts group Gr2 in combination with the parts P03.

Next, the parts group for the parts P04 is considered. The parts P04 that will not be used for the workpiece A3, B1 to B3, C1, C2, and D3 to D5 is provisionally determined as the parts group Gr3 in combination with the parts P05, P06, and P08 and any one of the parts P03, P07, P09, and P11. In the example of FIG. 5, the parts P04 is provisionally determined as one parts group Gr3 in combination with the parts P05, P06, P08 and the parts P07 (parts P05 to P08).

Next, the parts group for the parts P09 is considered. The parts P09 that will not be used for the workpiece A1 to B4 and D1 to D6 are provisionally determined as one parts group Gr4 in combination with the parts P10. Next, the parts group for the parts P11 is considered. The parts P11 that will not be used for the workpiece A1 to B4 and D1 to D6 are provisionally determined as one parts group Gr5 in combination with the parts P12 to P14.

Next, the parts group for the parts P15 to P27 is considered, but the parts P15 to P27 cannot avoid the passing-by during the distribution in the predetermined period by any combination. Such parts P15 to P27 are provisionally determined as non-group parts.

The parts group provisionally determined so as to satisfy the one-row-one-picking condition can be plural combinations other than those illustrated in FIG. 5, for example, combining the parts P02 with the parts P07 into one parts group Gr2. Further, in the process of determining the storage position in the storage section 20 by combining the provisionally determined parts groups Gr1 to Gr5 and the non-group parts, numerous combinations occur additionally.

In order to determine which of these combinations is the optimum, a penalty score corresponding to each condition is set. For example, if there is a row that does not satisfy the one-row-one-picking condition, fifty thousand points are added as the penalty score. In order to suppress the occurrence of the congestion in each row of the storage section 20, for example, when two or more picking works are performed in a single row, one point is added as the penalty score.

Among the combinations determined in consideration of the respective conditions, the storage position corresponding to the combination having the smallest total value of the penalty score is finally determined as the optimum storage position. The storage position may be determined when a combination having the total value of the penalty score equal to or less than a preset threshold value is determined. A penalty score threshold may be set for each condition. By setting the weighting in accordance with the importance of each condition as the penalty score, the best parts storage position can be determined efficiently.

Next, the combination optimizing condition will be described. The combination optimizing condition is a condition for optimizing the storage efficiency of the parts 21 stored in each storage space of the storage section 20, are for effectively utilizing the storage space by storing the parts having the same degree of the depth, opening, and height of the required storage space in the one same row. The non-group parts P15 to P27 provisionally determined to satisfy the one-row-one-picking condition are classified into the parts groups Gr1 to Gr5 provisionally determined to satisfy the one-row-one-picking condition considering the combination optimizing condition. When the number of provisionally determined parts groups is less than five, the non-group parts are combined with each other.

Figure 6A:
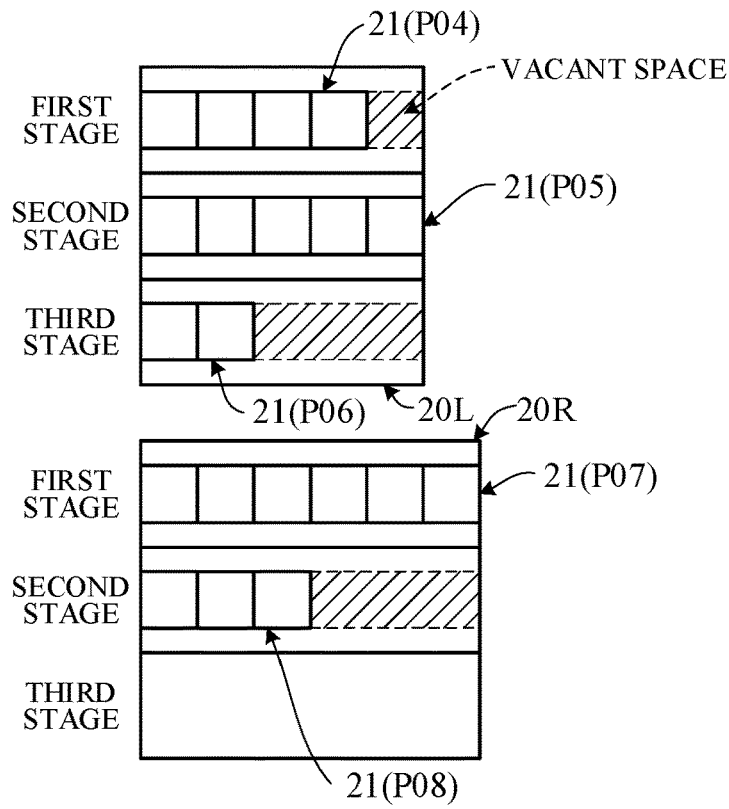
FIG. 6A is a drawing schematically showing an example of arrangement of the parts stored in the storage section in FIG. 1, seen from front and rear sides.
Figure 6B:
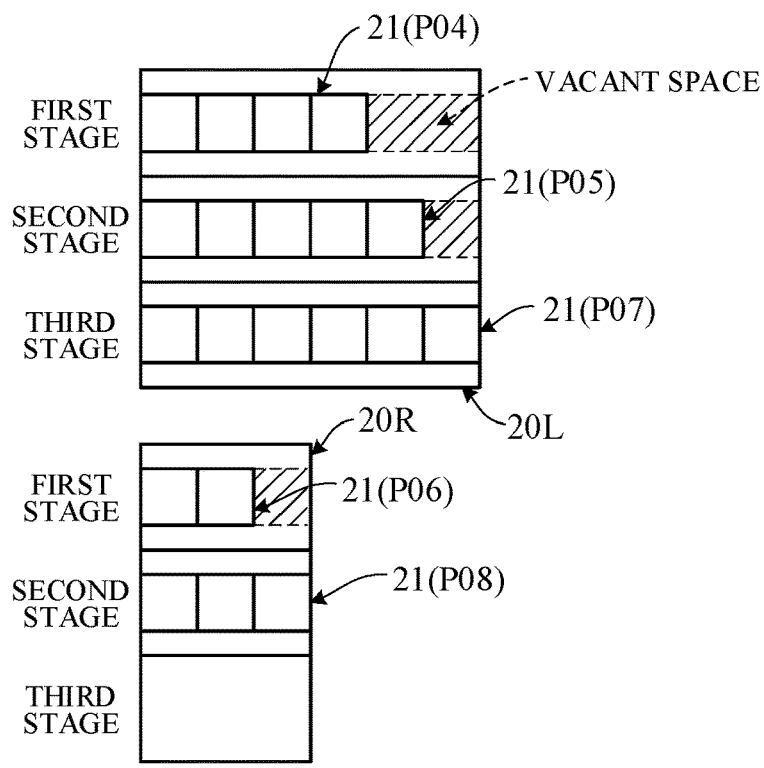
FIG. 6B is a front and rear side views drawing schematically showing another example of arrangement of the parts stored in the storage section in FIG. 1, seen from front and rear sides.

FIG. 6A and FIG. 6B are drawings schematically showing an example of arrangement of the parts (container accommodating the parts) 21 stored in the storage section 20, and showing arrangement of the parts 21 when seeing the rows of the storage sections 20L and 20R where the parts group Gr3 in FIG. 5 are stored from the front and rear sides. The storage efficiency of the parts 21 stored in the respective storage space of the storage section 20 varies depending on whether to store the parts 21 classified into the parts group (in the drawing parts group Gr3) (in the drawing parts P04 to P08) in the storage sections 20L or 20R.

As shown in FIG. 6A, in the storage section 20L in which the parts P04, P05, and P06 respectively corresponding to four containers, five containers, and two containers are stored, vacant space corresponding to at least four containers is generated in the depth direction. In the storage section 20R in which the parts P07 and P08 respectively corresponding to six containers and three containers are stored, vacant space corresponding to at least three containers is generated in the depth direction. In this case, vacant space corresponding to at least seven containers is generated in the depth direction in the entire row.

On the other hand, as shown in FIG. 6B, in the storage section 20L in which the parts P04, P05, and P07 respectively corresponding to four containers, five containers, and six containers are stored, vacant space corresponding to at least three containers is generated in the depth direction. In the storage section 20R in which the parts P06 and P08 respectively corresponding to two containers and three containers are stored, vacant space corresponding to at least one container is generated in the depth direction. In this case, vacant space corresponding to at least four containers is generated in the depth direction in the entire row.

As shown in FIG. 6A and FIG. 6B, the storage efficiency of the parts 21 stored in the storage sections 20L, 20R in the depth direction varies with the combination of the storage positions of the parts 21. In order to determine which of the combinations is the optimum, the penalty score is also set for the combination optimizing condition. For example, in the case where the depth of the storage space required for the parts 21 stored in a single row is not uniform with respect to each stage, one penalty point is added in accordance with the vacant space. The storage efficiency in the opening direction and the height direction can be similarly considered.

Next, the layout condition will be described. The layout condition is a condition for efficiently laying out the storage section 20, and for effectively utilizing the factory space by combining the arrangement of each row so that the depth of each row of the storage section 20 change gradually, for example, linearly, along the traveling direction of the worker P2. The layout-efficiency of the storage section 20L, 20R in the factory space varies depending on how the rows in which the parts groups Gr1 to Gr5 are stored are stored.

Figure 7A:
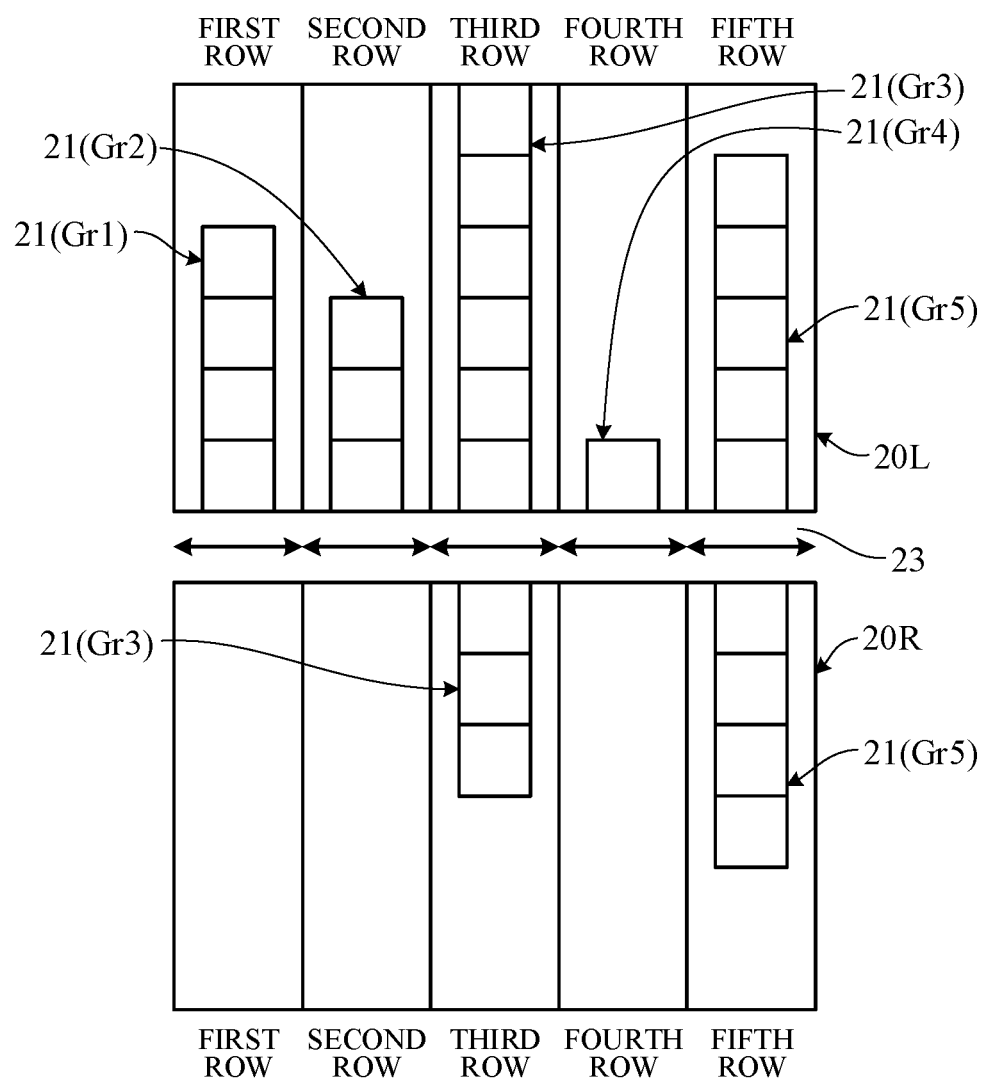
FIG. 7A is a drawing schematically showing an example of arrangement of the parts stored in the storage section in FIG. 1, seen from above.
Figure 7B:
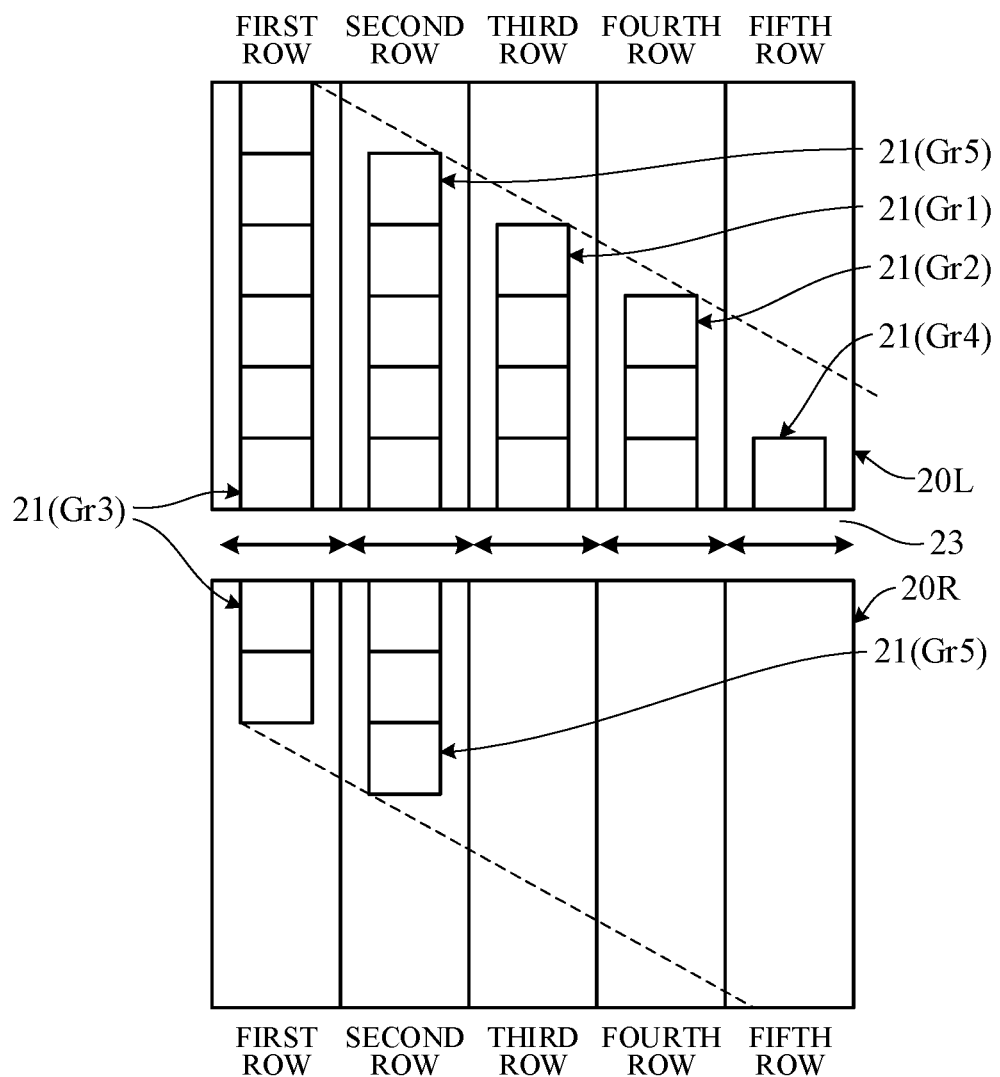
FIG. 7B is a drawing schematically showing another example of arrangement of the parts stored in the storage section in FIG. 1, seen from above.

FIG. 7A and FIG. 7B are drawings schematically showing examples of arrangement of the parts (containers accommodating the parts) 21 stored in the storage section 20, showing arrangements of the parts 21 in a stage with the maximum depth in each row, when viewing the storage sections 20L and 20R from above. For example, in FIG. 7A, for the third row of the storage section 20L in which the parts P04, P05, and P07 classified into the parts group Gr3 (FIG. 6B) are stored, the arrangement of the parts 21 in the third stage in which the parts P07 corresponding to six containers is stored is shown. For the third row of the storage section 20R in which the parts P06 and P08 are stored, the arrangement of the parts 21 in the second stage in which the parts P08 corresponding to three containers is stored is shown.

In the storage section 20L in FIG. 7A, the parts groups Gr1, Gr2, Gr3, Gr4, and Gr5, whose maximum depth respectively corresponding to four containers, three containers, six containers, one container, and five containers, are arranged along the traveling direction of the worker P2. Thus, if the depth of each row of the storage section 20 is not gradually changed along the traveling direction of the worker P2, it is difficult to align the entire shape of the storage section 20 in a linear shape along the lanes 22 and 23, and it is difficult to lay out the storage section 20 efficiently in the factory space.

On the other hand, in the storage section 20L in FIG. 7B, the parts groups Gr3, Gr5, Gr1, Gr2, and Gr4, whose maximum depth respectively corresponding to six containers, five containers, four containers, three containers, and one container, are arranged along the traveling direction of the worker P2. Thus, if the depth of each row of the storage section 20 is gradually changed along the traveling direction of the worker P2, it becomes possible to align the entire shape of the storage section 20 in a linear shape along the lanes 22 and 23 and to lay out the storage section 20 efficiently in the factory space.

When the provisionally determined parts groups Gr1 to Gr5 are stored in the first row to the fifth row considering the layout condition, the layout (shape) to be the target of the storage section 20 is determined as shown by a broken line in FIG. 7B, and the target depth of each row is determined. By classifying the non-group parts P15 to P27 provisionally determined in accordance with this target depth into the respective parts groups Gr1 to Gr5, the parts groups Gr1 to Gr5 for efficiently laying out the storage section 20 in the factory space can be finally determined.

Figure 9A:
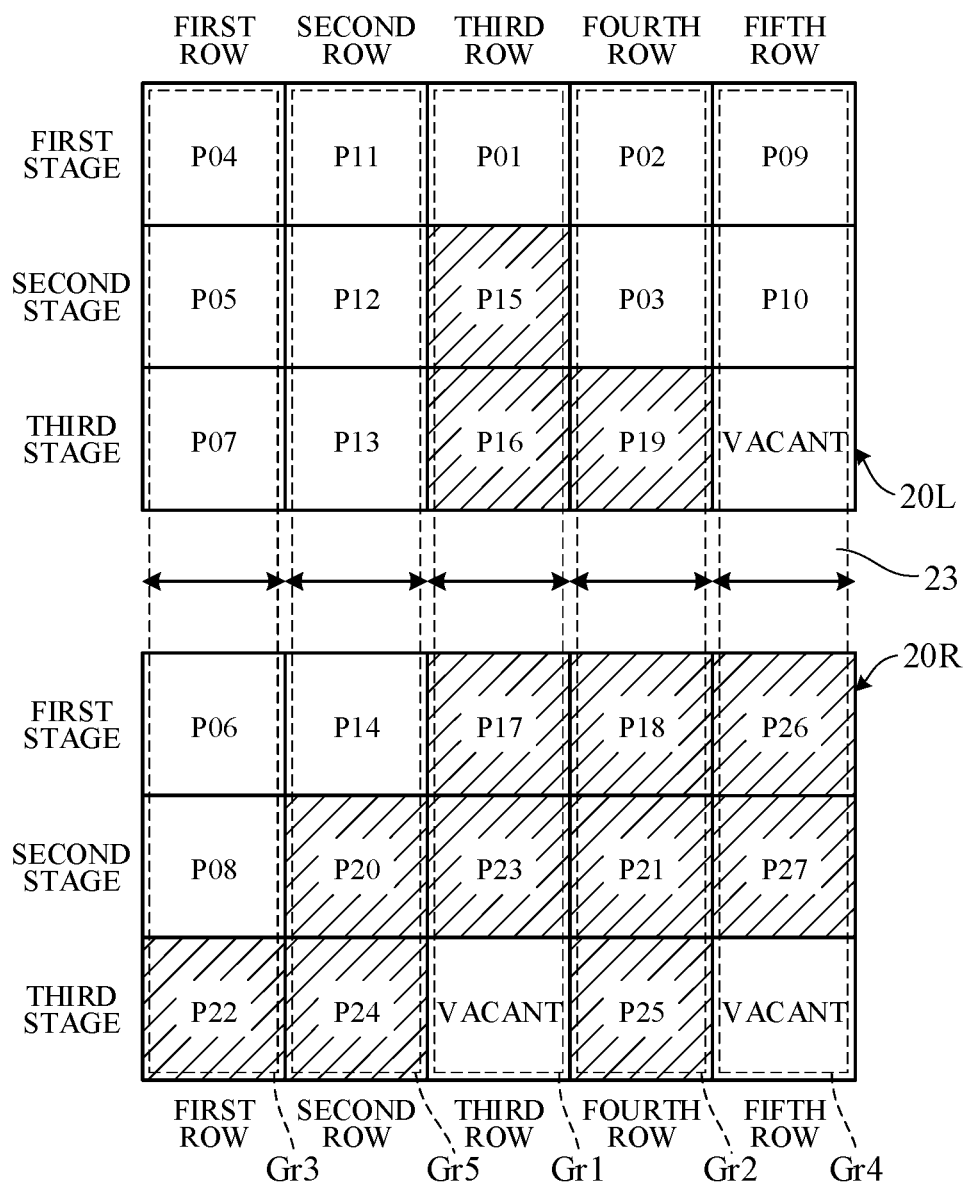
FIG. 9A is a drawing when arranging non-group parts into vacant storage spaces of the storage section shown in FIG. 8.
Figure 9B:
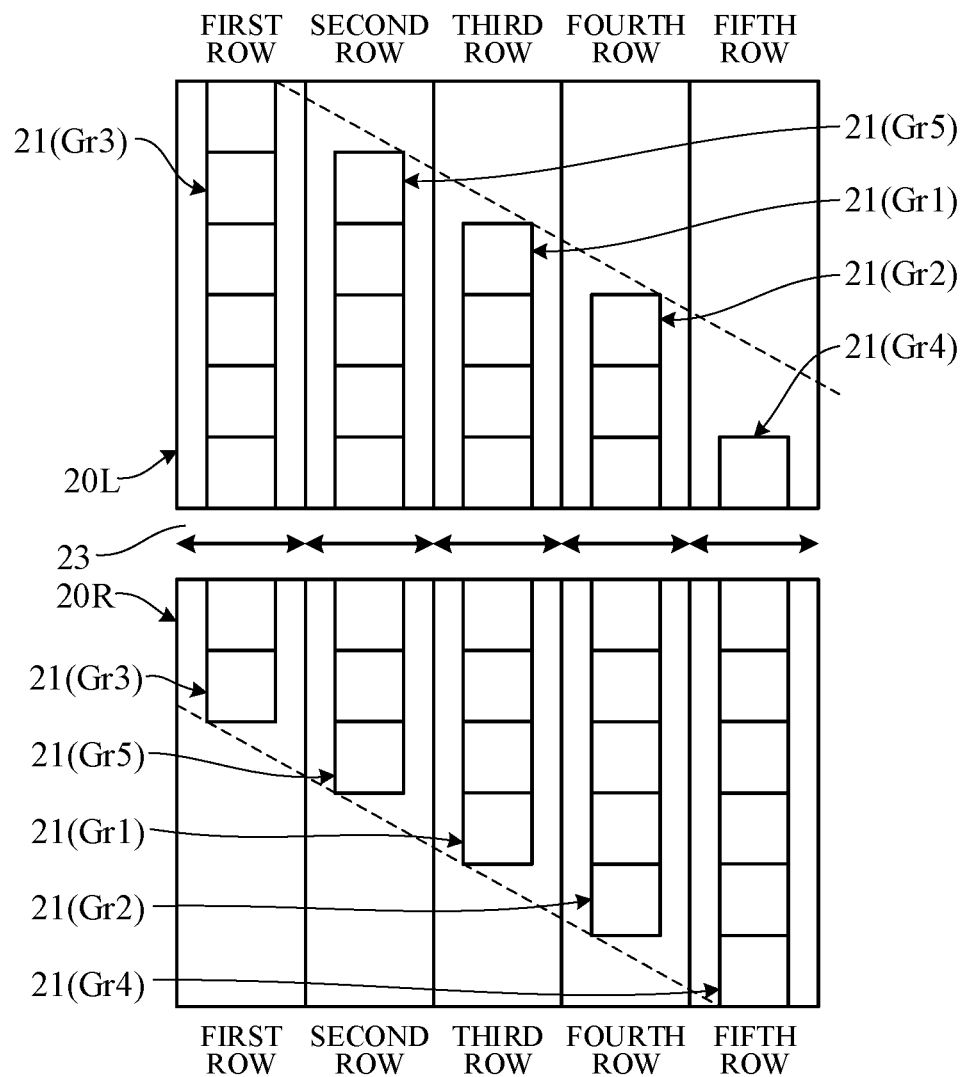
FIG. 9B is a drawing schematically showing arrangement of parts stored in the storage section in FIG. 9A, seen from above.

FIG. 8 is a drawing schematically showing arrangement of the parts 21 stored in the storage sections 20L and 20R in FIG. 7B, seen from left and right sides, showing arrangement of the parts P01 to P14 provisionally determined as the parts groups Gr1 to Gr5. FIG. 9A is a drawing when arranging the non-group parts P15 to P27 into the vacant storage spaces in the storage sections 20L and 20R shown in FIG. 8, and FIG. 9B is a drawing schematically showing arrangement of the parts 21 stored in the storage sections 20L and 20R in FIG. 9A, seen from above.

As shown in FIG. 8 and FIG. 9A, the provisionally determined non-group parts P15 to P27 are classified into the respective parts groups Gr1 to Gr5 and stored in the vacant storage spaces (stages) of the respective rows so as to have a target depth of the respective rows determined as indicated by a broken line in the drawing 7B. As a result, as shown in FIG. 9B, each row of the storage section 20 is arranged so that the depth of each row of the storage section 20 changes gradually along the traveling direction of the worker P2.

Figure 10:
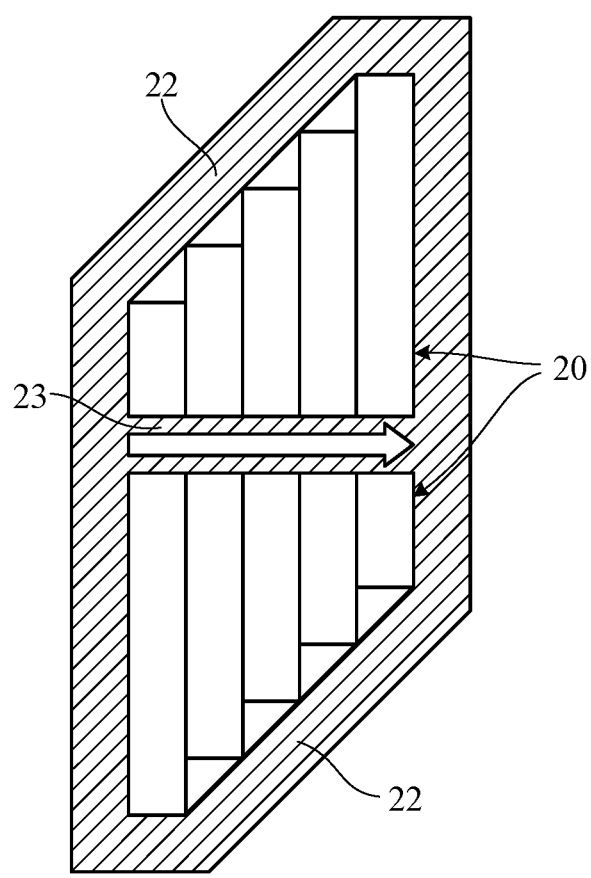
FIG. 10 is a drawing showing an example of a layout of the storage section shown in FIG. 9A and FIG. 9B, seen from above.

FIG. 10 is a drawing showing an example of a layout of the storage section 20 seen from above. In the storage section 20 in which the parts 21 are stored as shown in FIG. 9A and FIG. 9B, as shown in FIG. 10, the entire shape is aligned in a linear shape along the lanes 22, 23 and it can be efficiently laid out in the factory space. For example, by adjusting the entire shape of the storage sections 20L, 20R as viewed from above substantially triangular or substantially trapezoidal, it is possible to efficiently lay out the storage section 20 and the lanes 22 and 23.

As described above, the layout efficiency of the storage section 20 in the factory space varies with the combination of the arrangement of the respective rows of the storage section 20 and the arrangement of the respective parts 21 into the respective rows. In order to determine which of the plural combinations is the optimum, the penalty score is also set for the layout condition. For example, when the depth of each row of the storage section 20 does not gradually increase or decrease along the traveling direction, the penalty score of fifty points is added in accordance with the number of rows that do not satisfy the condition.

Furthermore, in addition to the one-row-one-picking condition, the combination optimizing condition, and the layout condition, the work efficiency of the worker P1 who stores the parts 21 into the storage section 20 can also be considered. That is, when there is a constraint on the depth of the storage section 20, the same type of parts 21 are stored in plural storage positions, in such a case, if the same type of parts 21 are stored in storage positions spaced from each other, the picking work becomes complicated and the work efficiency becomes reduced. Therefore, for example, when the same type of parts 21 are arranged in different rows, one point is added as the penalty score, and in this case, when the same type of parts 21 are stored in rows not adjacent to each other, one point is added as the penalty score.

Figure 11:
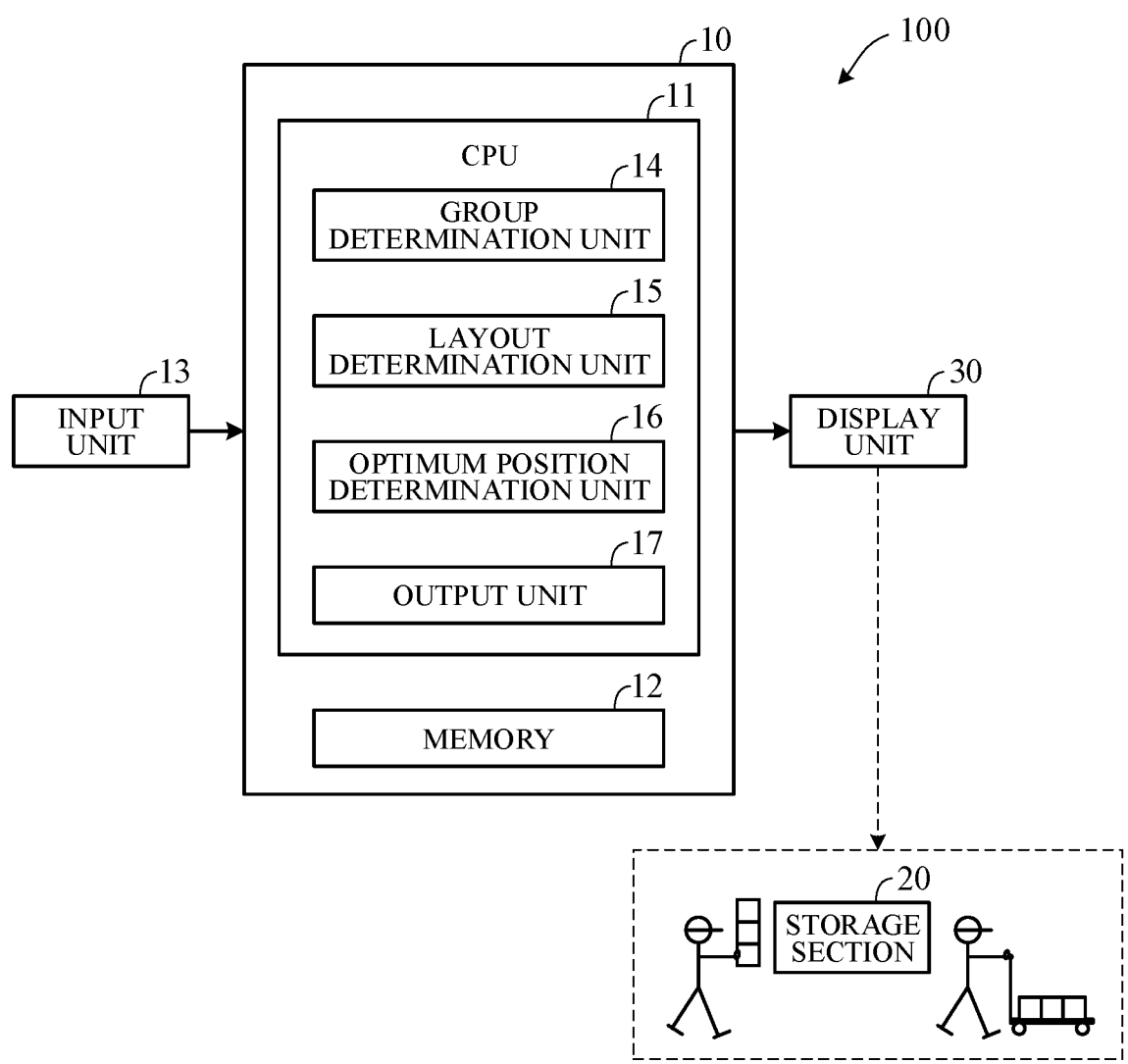
FIG. 11 is a block diagram showing main configuration of a parts management system including the parts storage position determination apparatus according to the embodiment of the present invention.

FIG. 11 is a block diagram showing main configuration of a parts management system 100 including the parts storage position determination apparatus 10 according to the embodiment of the present invention. As shown in FIG. 11, the part management system 100 includes the parts storage position determination apparatus (hereinafter, apparatus) 10 that determines the storage position of the parts, the storage section 20 that accommodates the parts, and a display unit 30 that displays the storage position of the parts determined by the apparatus 10.

The apparatus 10 includes an arithmetic processing unit having a CPU 11, a memory 12 such as ROM and RAM, other peripheral circuits such as I/O interfaces, and the like. An input unit 13 configured by a keyboard, a mouse, a touch panel, or the like, and a display unit 30 configured by a liquid crystal display or the like are connected to the apparatus 10 by wire or wireless, respectively.

Through the input unit 13, the number of rows and the number of stages of the storage sections 20L and 20R, the correspondence relationship between the type of the workpiece and the type of the parts corresponding to the product to be produced in a predetermined time period (FIG. 4), the number of workpieces to be produced, the number of each parts to be assembled to each workpiece (the number to be stored in the storage section 20), and the like are input. If there are constraints to the space that allows placing of the storage section 20 in the depth, opening, or height direction of the storage section 20, these thresholds are also input. The penalty scores corresponding to each condition are also input. Various kinds of information input through the input unit 13 are stored in the memory 12.

The CPU 11 functions as: a group determination unit 14 configured to determine the parts group to be stored in the one same row of the storage section 20 based on the correspondence relationship stored in the memory 12; a layout determination unit 15 configured to determine the layout of the rows for each parts group; an optimum position determination unit 16 configured to determine the optimum storage position of the parts 21; and an output unit 17 configured to output the determined storage position of the parts 21 to the display unit 30.

The group determination unit 14 provisionally determines the parts groups and the non-group parts so as to satisfy the one-row-one-picking condition based on the correspondence relationship between the type of the workpiece and the type of the parts stored in the memory 12. Then, the group determination unit 14 classifies the non-group parts into the parts groups considering the combination optimizing condition and finally determines the parts groups.

The layout determination unit 15 determines the layout of rows of each parts groups provisionally determined by the group determination unit 14 considering the layout condition. The group determination unit 14 classifies the non-group parts into the parts groups arranged by the layout determination unit 15 and finally determines the parts groups. Thereby, the combination of the storage positions of the parts 21 in the storage section 20 is determined.

The optimum position determination unit 16 calculates the penalty score with respect to the combination of the storage positions of the parts 21 determined by the group determination unit 14 and the layout determination unit 15, and determines the optimum storage position of the parts 21 in the storage section 20 based on the calculated penalty score. For example, calculates the penalty score of each of the plural combinations of the storage positions of the parts 21, and determines the storage positions having the minimum penalty score as the optimum storage positions. It is also possible to calculate the penalty score of each of the combinations of the storage positions of the parts 21, and to determine the storage positions having the penalty score of equal to or lower than a threshold as the optimum storage positions.

The output unit 17 outputs the storage positions of the parts 21 in the storage section 20 determined by the optimum position determination unit 16 to the display unit 30. If storing and picking of the parts 21 in the storage section 20 are automatically performed by a facility such as a robot, the output unit 17 may output the determined storage positions to a facility controller or the like.

Figure 12:
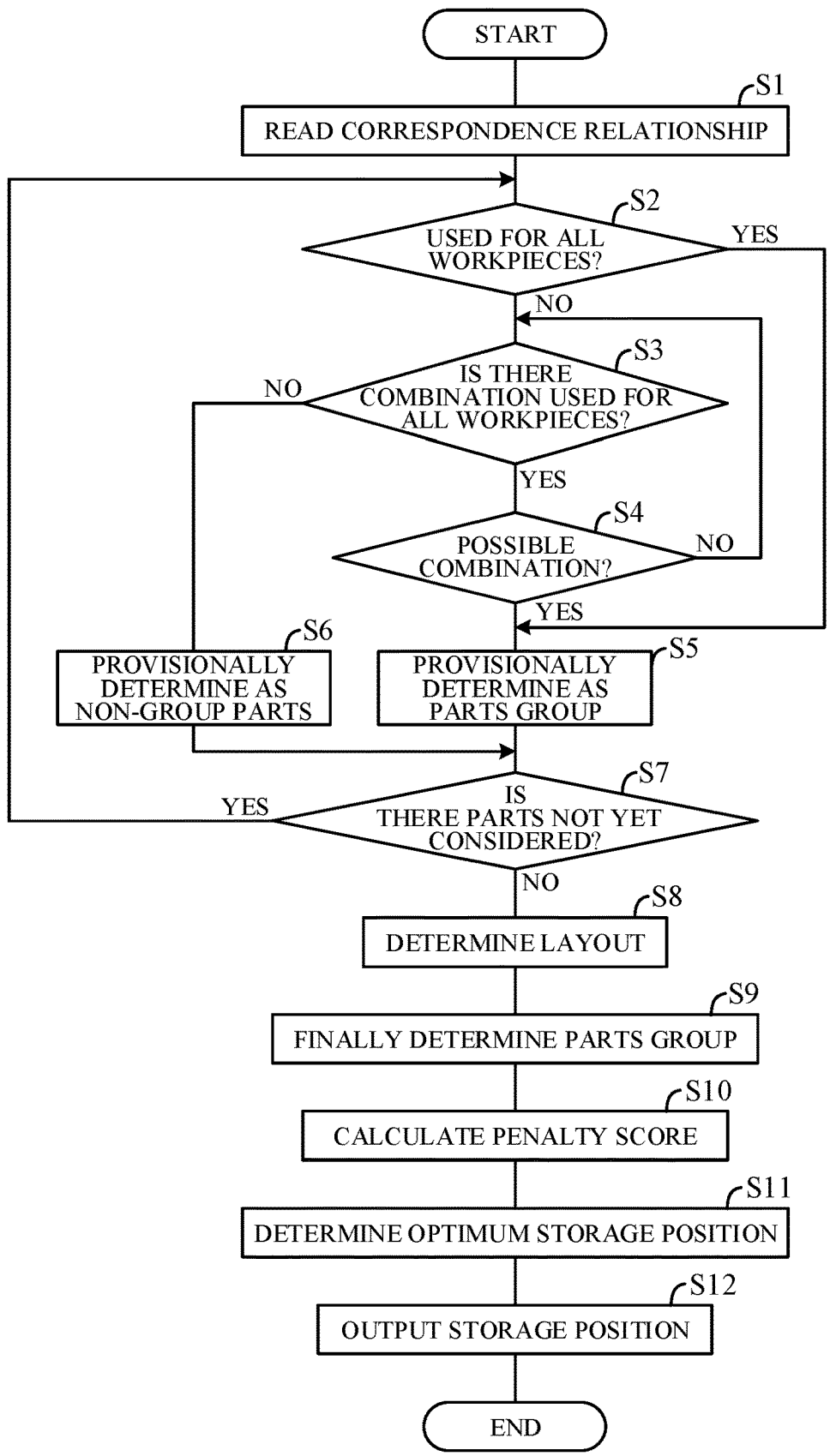
FIG. 12 is a flowchart showing an example of processing performed by the parts storage position determination apparatus according to the embodiment of the present invention.

FIG. 12 is a flowchart showing an example of processing performed by the apparatus 10 in accordance with a program stored in the memory in advance. The processing shown in this flowchart is executed when various kinds of information is input through the input unit 13.

First, in step S1, in processing performed by the group determination unit 14, the correspondence relationship between the type of the workpiece and the type of the parts stored in the memory 12 (FIG. 4) is read. Next, in step S2, based on the correspondence relationship read in step S1, it is determined whether all workpieces are used with respect to each parts 21. When step S2 is negative, the process proceeds to step S3; when step S2 is affirmative, the process proceeds to step S5.

In step S3, it is determined whether all workpieces are used by combining with other parts 21 not yet considered. When step S3 is affirmative, the process proceeds to step S4; when step S3 is negative, the process proceeds to step S6. In step S4, it is determined whether the combination in step S3 is possible based on thresholds of the depth, opening, or height of the storage section 20 stored in the memory 12. When step S4 is negative, the process returns to step S3.

When step S2 or S4 is affirmative, the process proceeds to step S5 and the parts group is provisionally determined. On the other hand, when step S3 is negative, the process proceeds to step S6 and the parts 21 is provisionally determined as the non-group parts, Next, in step S7, it is determined whether there is the parts 21 not yet considered. When step S7 is affirmative, the process returns to step S2; when step S7 is negative, the process proceeds to step S8.

In step S8, in processing performed by the layout determination unit 15, the layout of the rows of each parts group provisionally determined in step S5 is determined considering the layout condition. Next, in step S9, in processing performed by the group determination unit 14, the non-group parts provisionally determined in step S6 is classified into the parts groups arranged in step S8, and the parts groups are finally determined. Specifically, in step S8, S9, the combination of the storage positions of the parts 21 in the storage section 20 is determined.

Next, in step S10, in processing performed by the optimum position determination unit 16, the penalty score for the combination of the storage positions of the parts 21 in the storage section 20 determined in step S8, S9 is calculated. Next, in step S11, the optimum storage positions of the parts 21 in the storage section 20 are determined based on the penalty score calculated in step S10. Next, in step S12, in processing performed by the output unit 17, the storage positions determined in step S11 are output to the display unit 30.

The flow of the distribution to which the above-described apparatus 10 is applied is summarized as follows. As shown in FIG. 1, the parts 21 delivered to the factory are stored into the storage section 20 by the worker P1 in accordance with the storage positions displayed on the display unit 30 (step S12 in FIG. 12). Since the storage positions of the same type of parts 21 are designated close (step S10, S11), it is possible to improve the efficiency of the storing work by the worker P1.

The parts 21 stored in the storage section 20 are picked from the storage section 20 by the worker P2 in accordance with the storage positions displayed on the display unit 30 (step S12). Since the parts 21 required for the distribution for each workpiece are stored in each rows in a dispersed manner (steps S1 to S7, S9 to S11), the efficiency of the picking work by the worker P2 can be improved regardless of the type of the workpiece.

The depth, opening, and height of the shelf of the storage section 20 are adjusted by changing length, number, and partitioning position of pipes constituting the shelf in accordance with the arrangement of the parts 21 to be stored. Since the parts 21 having the same degree of depth, opening, and height of the storage space required for storage are arranged in the one same row (S9 to S11), the storage efficiency of the parts 21 stored in each storage space of the storage section 20 can be improved.

Since the rows of the storage sections 20 are arranged so that the depth of the storage section 20 gradually changes along the lanes 22, 23 (steps S8 to S11), the entire storage section 20 can be arranged in a substantially triangular shape (FIG. 9B). Thus, as shown in FIG. 10, it is possible to improve the layout efficiency of the storage section 20 and the lanes 22, 23 in the factory space.

According to the embodiment of the present invention, the following advantageous effects can be obtained:

(1) The apparatus 10 is configured to determine the storage position of the plural type of parts 21 assembled to workpieces corresponding to the plural type of products produced in a predetermined period in accordance with a production schedule, in the storage section 20 having the plural row of storage space facing the lane 22, 23.

The apparatus 10 includes: the memory 12 configured to store the correspondence relationship between the type of the workpiece corresponding to the products produced in the predetermined period and the type of the parts 21 assembled to the workpiece with respect to each type of the workpiece; the group determination unit 14, the layout determination unit 15, and the optimum position determination unit 16 (CPU 11) configured to determine the storage position of the plural type of parts 21 in the storage section 20 based on the correspondence relationship stored in the memory 12; and the output unit 17 (CPU 11) configured to output the storage position determined (FIG. 11).

The group determination unit 14 and the optimum position determination unit 16 determines the storage position of the plural type of parts 21 in the storage section 20, so that each of the plural type of parts 21 corresponding to the workpiece is respectively dispersed into each of the plural row of the storage section 20 (FIG. 5). With this, it becomes possible to suppress the occurrence of the passing-by in each row of the storage section 20, and to improve the efficiency of the picking work by the worker P2 regardless of the type of workpiece.

(2) The layout determination unit 15 and the optimum position determination unit 16 determine a row in which each of the plural type of parts 21 is stored in the storage section 20 based on the length in the depth direction intersecting the lane 23 required for storing the parts 21 in each of the plural row of the storage section 20 (FIG. 7B). With this, it becomes possible to efficiently layout the storage section 20 in the factory space.

(3) Each of the rows of the storage section 20 has plural stages in the height direction intersecting the lane 23 (FIG. 1). The group determination unit 14 and the optimum position determination unit 16 determine the storage position of the plural type of parts 21 in the storage section 20 so that the length in the depth direction required for storing the parts 21 in each of the stages is aligned in each of the rows of the storage section 20 (FIG. 6B). With this, it becomes possible to improve the storage efficiency of the parts 21 stored in each storage space of the storage section 20.

(4) The group determination unit 14 and the optimum position determination unit 16 determine the storage position of the plural type of parts 21 in the storage section 20 so that the number of times of storing the parts 21 in each of the rows of the storage section 20 matches each other or the number of times of picking the parts 21 stored in each of the rows of the storage section 20 matches each other. With this, it becomes possible to suppress the occurrence of the congestion in each row of the storage section 20, and to improve the efficiency of the picking work by the worker P2 regardless of the type of workpiece.

The above embodiment can be modified in various manners. Hereinafter, modified examples will be described. In the embodiment described above, although the storage space of the storage section 20 has five rows, three stages in left and right sides respectively, common openings and heights, a storage section having a plural row of storage space facing a lane is not limited to the one described above. In the embodiment described above, although the storage sections 20L and 20R are arranged on the opposite sides of the one single lane 23, a layout of the storage section is not limited to the one described above.

Figure 13A:
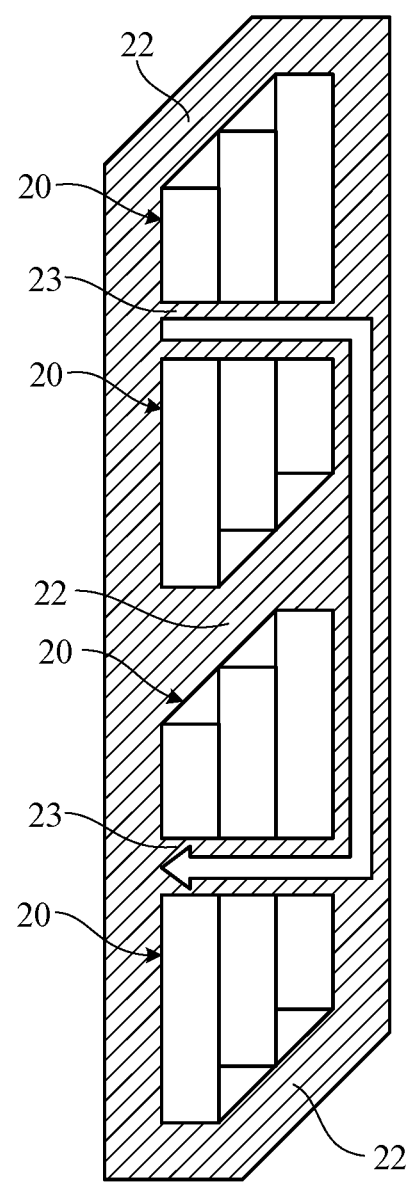
FIG. 13A is a drawing showing a modification of FIG. 10.
Figure 13B:
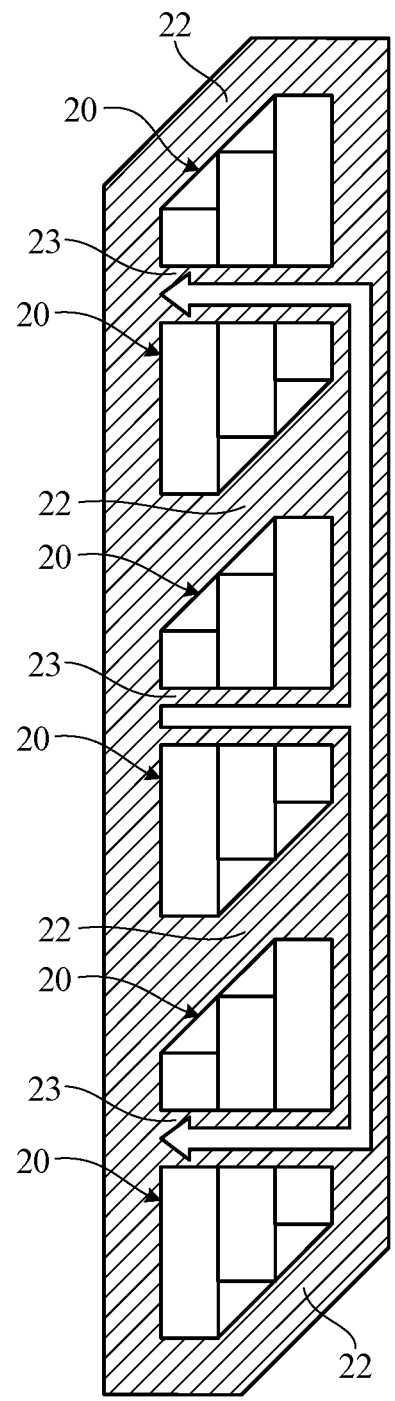
FIG. 13B is a drawing showing another modification of FIG. 10.
Figure 13C:
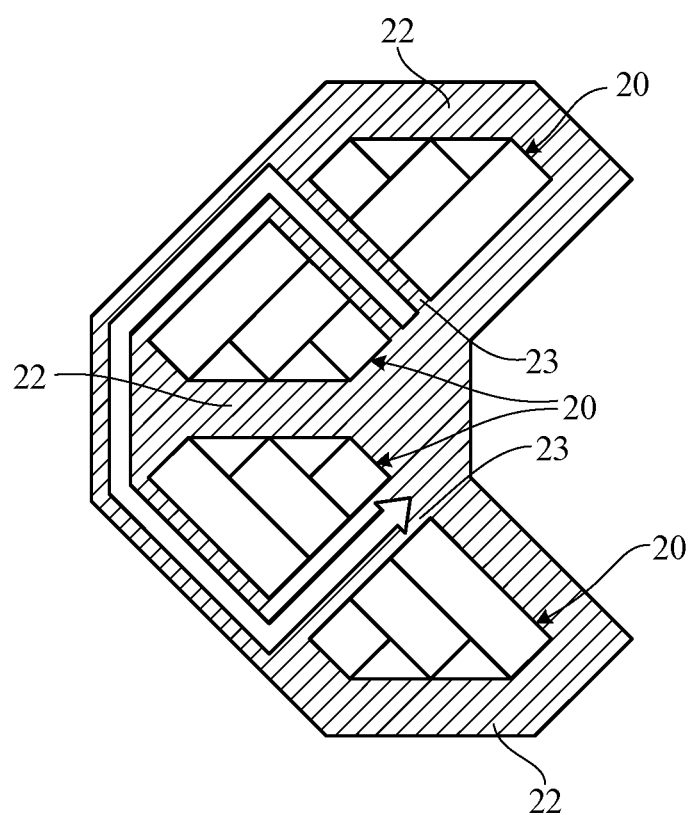
FIG. 13C is a drawing showing another modification of FIG. 10.

FIG. 13A to FIG. 13C are diagrams showing modifications of the layout of the storage section 20. As shown in FIG. 13A to FIG. 13C, plural storage sections 20 facing plural lanes 23 may be arranged in accordance with the shape of the factory space. For example, when there are many models to be produced and there are many kinds of workpieces, the layout may have branched course of the worker P2 as shown in FIG. 13B, providing storage area for common parts to be used in all models (center in the drawing) and storage areas for dedicated parts of each models (upper and lower in the drawing).

In the above embodiment, although the group determination unit 14, the layout determination unit 15, and the optimum position determination unit 16 determine the storage positions of the plural type of parts 21 in the storage section 20 after determining the number of the rows, layout, and the like of the storage section 20, an arithmetic unit configured to determine storage positions of a plural type of parts in a storage section is not limited to the one described above. For example, it is also possible to provisionally determine plural patterns of the number of rows, layout, and the like of the storage section 20, determine the optimum part storage positions in each case, and determine the number of rows, layout, and the like having the minimum penalty score.

In the above embodiment, although the correspondence relationship between the type of the workpiece and the type of the parts is stored in the memory 12 of the apparatus 10, a storage unit configured to store a correspondence relationship between type of workpiece and type of parts to be assembled to the workpiece is not limited to the one described above. The storage unit may be provided separately from the apparatus 10, for example, the storage unit may be an external memory connected to the apparatus 10, a storage area on a server, or the like. In this case, what reads various kinds of information from the storage unit is called as the arithmetic unit.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 10 parts storage position determination apparatus (apparatus), 11 CPU, 12 memory, 13 input unit, 14 group determination unit, 15 layout determination unit, optimum position determination unit, 17 output unit, 20 (20L, 20R) storage section, 21 parts, 22 storing-side lane, 23 picking-side lane, 30 display unit, 100 parts management system.

The invention claimed is:

1. A parts storage position determination apparatus configured to determine a storage position of a plural type of parts to be assembled to a workpiece corresponding to a plural type of products produced in a predetermined period in accordance with a production schedule, in a storage section having a plural row of storage space facing a lane, comprising:
a storage unit configured to store a correspondence relationship between a type of the workpiece corresponding to the products produced in the predetermined period and a type of the parts to be assembled to the workpiece with respect to each type of the workpiece;
an arithmetic unit configured to determine the storage position of the plural type of parts in the storage section based on the correspondence relationship stored in the storage unit; and
an output unit configured to output the storage position determined by the arithmetic unit, wherein
the arithmetic unit determines the storage position of the plural type of parts in the storage section, so that each of the plural type of parts corresponding to the workpiece is respectively dispersed into each of the plural row of the storage section.

2. The parts storage position determination apparatus according to claim 1, wherein
the arithmetic unit determines a row in which each of the plural type of parts is stored in the storage section based on a length in a depth direction intersecting the lane required for storing the parts in each of the plural row of the storage section.

3. The parts storage position determination apparatus according to claim 2, wherein
each of the plural row of the storage section has plural stages in a height direction intersecting the lane, wherein
the arithmetic unit determines the storage position of the plural type of parts in the storage section so that the length in the depth direction required for storing the parts in each of the plural stages is aligned in each of the plural row of the storage section.

4. The parts storage position determination apparatus according to claim 1, wherein
the arithmetic unit determines the storage position of the plural type of parts in the storage section so that a number of times of storing the parts in each of the plural row of the storage section matches each other or a number of times of picking the parts stored in each of the plural row of the storage section matches each other.

5. A parts management system configured to manage a plural type of parts to be assembled to a workpiece corresponding to a plural type of products produced in a predetermined period in accordance with a production schedule, comprising:
the parts storage position determination apparatus according to claim 1;
the storage section configured to store the plural type of parts; and
a display unit configured to display the storage position outputted by the output unit.

6. A parts storage position determination method configured to determine a storage position of a plural type of parts to be assembled to a workpiece corresponding to a plural type of products produced in a predetermined period in accordance with a production schedule, in a storage section having a plural row of storage space facing a lane, comprising:
- determining a storage position of the plural type of parts in the storage section based on a correspondence relationship between a type of the workpiece corresponding to the products produced in the predetermined period and a type of the parts to be assembled to the workpiece with respect to each type of the workpiece, stored beforehand; and
- outputting the storage position determined, wherein
- the determining includes determining the storage position of the plural type of parts in the storage section, so that each of the plural type of parts corresponding to the workpiece is respectively dispersed into each of the plural row of the storage section.

* * * * *